United States Patent [19]

Schupp et al.

[11] Patent Number: 4,557,814

[45] Date of Patent: Dec. 10, 1985

[54] SYNTHETIC RESIN CARRYING BASIC NITROGEN GROUPS, AND ITS PREPARATION

[75] Inventors: Eberhard Schupp, Schwetzingen; Werner Loch, Erpolzheim; Rolf Osterloh, Gruenstadt; Klaas Ahlers, Muenster, all of Fed. Rep. of Germany

[73] Assignee: BASF Aktiengesellschaft, Fed. Rep. of Germany

[21] Appl. No.: 629,762

[22] Filed: Jul. 11, 1984

[30] Foreign Application Priority Data

Jul. 12, 1983 [DE] Fed. Rep. of Germany ....... 3325061

[51] Int. Cl.$^4$ ...................... C08G 59/50; C08G 59/14
[52] U.S. Cl. .................................. 204/181.7; 523/415; 523/416; 523/424; 525/481; 525/510; 528/45; 528/121
[58] Field of Search ................. 528/45, 121; 525/481, 525/510; 523/415, 416, 424; 524/901; 204/181 C

[56] References Cited

U.S. PATENT DOCUMENTS

| | | | |
|---|---|---|---|
| 2,772,248 | 11/1956 | Liebermann | 260/29.2 |
| 3,337,606 | 8/1967 | Floyd | 528/121 X |
| 3,378,600 | 4/1968 | Hodges et al. | 528/121 |
| 3,401,146 | 9/1968 | Kamal et al. | 528/123 |
| 3,547,886 | 12/1970 | Gardner et al. | 528/121 |
| 3,947,339 | 3/1976 | Jerabek et al. | 204/181 R |
| 4,017,438 | 4/1977 | Jerabek et al. | 260/29.2 EP |
| 4,139,510 | 2/1979 | Anderson | 260/47 |
| 4,252,703 | 2/1981 | Patzschke et al. | 260/29.2 EP |

FOREIGN PATENT DOCUMENTS 0040867 4/1981 European Pat. Off. .
1409728 10/1975 United Kingdom .

*Primary Examiner*—Earl Nielsen
*Attorney, Agent, or Firm*—Keil & Weinkauf

[57] ABSTRACT

A synthetic resin which carries basic nitrogen groups and can be diluted with water as a result of protonation with an acid can be obtained by reacting an epoxy resin, having a mean molecular weight $\overline{M}_n$ of from 300 to 6,000 and containing on average from 1.5 to 3.0 epoxide groups per molecule, with a diketimine of a primary diamine and, if appropriate, a secondary amine, which may additionally contain a tertiary amino group, a ketimine of a primary monoamine and/or a ketimine of a primary/tertiary diamine.

These resins are useful as binders for coating agents, in particular for the cathodic electrocoating of electrically conductive substrates.

17 Claims, No Drawings

SYNTHETIC RESIN CARRYING BASIC NITROGEN GROUPS, AND ITS PREPARATION

The present invention relates to synthetic resins which carry basic nitrogen groups and can be diluted with water as a result of protonation with an acid, their preparation, and coating agents, in particular for cathodic electrocoating, which can be prepared from these resins.

Reaction products of epoxy resins and polyamines have long been known. For example, U.S. Pat. No. 2,772,248 describes water-soluble epoxy resin/amine adducts obtained from resin-like epoxides and aliphatic polyamines. Before they are used, these products have to be freed from unreacted polyamine by distillation under reduced pressure at elevated temperatures. U.S. Pat. No. 4,139,510 describes the reaction of polyepoxides with an excess of polyamines. The excess amine is removed under reduced pressure, and the residue which remains is reacted with a monoepoxide or a monocarboxylic acid. Since, in order to avoid highly branched or even gelled products, the polyamine is used in excess in both cases, the amine has to be distilled under reduced pressure by a time-consuming and expensive procedure. In the case of higher amines, for example those having a boiling point substantially above 200° C. under atmospheric pressure, the amine cannot be removed completely.

German Published Application DAS No. 2,265,195 relates to an aqueous coating composition comprising a synthetic resin which can be deposited electrolytically and which is prepared from a resin containing epoxide groups, a polyamine derivative possessing latent primary amino groups which are blocked with ketimine groups and possessing one or more secondary amino groups, and, if appropriate, another primary or secondary amine. Synthetic resins prepared in this manner contain primary amino groups although excess polyamine is not used for their preparation. However, the process is unsuitable for incorporating polyamines into the epoxy resin chain as chain lengtheners, a step which is desirable for elastifying coatings produced from these resins.

It is an object of the present invention to provide novel synthetic resins which carry basic nitrogen groups, do not have the disadvantages described above and are suitable for the production of particularly flexible coatings.

We have found that this object is achieved by synthetic resins which carry basic nitrogen groups and can be diluted with water as a result of protonation with an acid, and which are obtainable by reacting (A) one or more epoxy resins having a mean molecular weight $\overline{M}_n$ of from 300 to 6,000 and containing on average from 1.5 to 3.0 epoxide groups per molecule with (B) a diketimine of a primary diamine and, if appropriate, (C) a secondary amine, which may additionally contain a tertiary amino group, a ketimine of a primary monoamine and/or a ketimine of a primary/tertiary diamine.

The number of epoxide equivalents of epoxy resin (A) which are used is preferably from 50 to 100%, based on the sum of the number of equivalents of ketimine and secondary amine of components (B) and (C).

The present invention furthermore relates to a synthetic resin which carries basic nitrogen groups, can be diluted with water as a result of protonation with an acid and is obtainable as described above, and some or all of whose hydroxyl groups have furthermore been reacted with partially blocked polyisocyanate to give urethane groups.

The present invention furthermore relates to coating agents which are prepared from the novel synthetic resins which can be diluted with water as a result of protonation with an acid and are in the form of aqueous dispersions which may or may not additionally contain crosslinking agents, organic solvents, pigments and/or further assistants and are used in particular for the cathodic electrocoating of electrically conductive substrates.

The present invention furthermore relates to coating agents which contain, as a binder, the novel synthetic resin carrying basic nitrogen groups, and additionally contain a crosslinking agent.

The present invention furthermore relates to coated articles which are obtained by applying the novel synthetic resins or coating agents and then carrying out baking.

It is very surprising that resins can be prepared by reacting a polyepoxixde with a diketimine, i.e. by reacting epoxide groups with ketimine groups, since in German Published Application DAS 2,265,195 the intention is to protect primary amino groups by ketimine formation before the reaction with epoxide groups, so that only secondary amino groups can react with the expoxide groups.

In comparison, we have found that ketimines of primary diamines, which, in contrast to the polyamines used according to German Published Application DAS 2,265,195, do not carry any secondary amino groups, can be reacted with epoxide groups of epoxy resins, the ketimine group reacting as a monofunctional group, i.e. one ketimine group reacts predominantly with only one epoxide group. If water is added to the ready-prepared synthetic resin, the ketone is eliminated and a secondary amino group is formed. Diketimines of primary diamines can therefore be incorporated into epoxy resins as chain lengtheners and terminal groups. By varying the components and the ratios of the numbers of equivalents, a large number of different synthetic resins possessing different properties can be prepared.

Regarding the components of the novel synthetic resins and their preparation, the following may be stated specifically:

(A) Suitable epoxy resins (A) are any materials which have a mean molecular weight $\overline{M}_n$ of from 300 to 6,000 and contain on average from 1.5 to 3.0 epoxide groups per molecule, preferably compounds with two epoxide groups per molecule. Preferred epoxy resins are those which have a mean molecular weight $\overline{M}_n$ of from 350 to 5,000, in particular from 350 to 2,000. Examples of particularly preferred epoxy resins are glycidyl ethers of polyphenols which contain on average two or more phenolic hydroxyl groups per molecule, which can be prepared in a conventional manner by etherification with an epihalohydrin in the presence of an alkali. Examples of suitable phenol compounds are 2,2-bis(4-hydroxyphenyl)propane, 4,4'-dihydroxybenzophenone, 1,1-bis(4-hydroxyphenyl)ethane, 1,1-bis(4-hydroxyphenyl)isobutane, 2,2-bis(4-hydroxy-tert.butylphenyl)propane, bis(2-hydroxynaphthyl)methane and 1,5-dihydroxynaphthalene. In some cases, it is desirable to use aromatic epoxy resins having a higher molecular weight. These are obtained by reacting one of the above diglycidyl ethers with a polyphenol, e.g. 2,2-bis(4-hydroxyphenyl)propane, and then reacting the resulting product further with epichlorohydrin to prepare a polyglycidyl ether.

Another suitable class of epoxy resins comprises polyglycidyl ethers of phenolic novolak resins.

Polyglycidyl ethers of polyhydric alcohols, such as ethylene glycol, diethylene glycol, triethylene glycol, 1,2-propylene glycol, propane-1,3-diol, pentane-1,5-diol, hexane-1,2,6-triol, glycerol and 2,2-bis(4-hydroxycyclohexyl)propane, are also suitable.

Polyglycidyl esters of polycarboxylic acids can also be used.

Among the polyglycidyl ethers, of polyphenols, which are preferred according to the invention, those having an epoxide equivalent weight of from 180 to 1,000 are particularly preferred.

Aromatic polyepoxides having a relatively high epoxide equivalent weight can be prepared from those having a lower epoxide equivalent weight and polyphenols before or during the reaction with the components (B) and (C).

(B) Suitable diketimines of primary diamines (B) are the ketimines of any ketones with any primary diamines. Ketimines of this type can be readily obtained from ketones and primary diamines, the water formed being removed, for example by azeotropic distillation.

Examples of suitable primary diamines are those which contain no further groups which react with epoxide groups under mild conditions. For example, they must not contain any secondary amino groups or mercaptan groups; alcoholic hydroxyl groups are not very reactive and therefore do not interfere. Examples of suitable primary diamines are ethylenediamine, 1,3-diaminopropane, 1,4-diaminobutane, 1,6-diaminohexane, 4,9-dioxadodecane-1,12-diamine, 4,4'-diaminodicyclohexylmethane and 9-aminomethylstearylamine. Amines, such as 2-(3-aminopropyl)cyclohexylamine, whose amino groups have different reactivities are particularly advantageous in some cases.

Apart from polyamines of this type which have a well defined low molecular weight, it is also possible to use oligomeric or polymeric polyamines having mean molecular weights $\overline{M}_n$ of not more than 3,000. Examples of such polyamines are diamines which can be prepared by reductive cyanoethylation of polyols, such as polytetrahydrofuran. Products of this type contain terminal primary amino groups in the form of aminopropoxy groups.

Diamines possessing additional amide groups, as obtained by, for example, condensation of a primary aliphatic or cycloaliphatic diamine with a dicarboxylic acid, such as adipic acid, sebacic acid or a dimeric fatty acid, can also be used in accordance with the invention. The amines described above can be employed alone or as a mixture with one another.

Particularly suitable ketones are those which, apart from the keto group, contain no further groups which are reactive toward a primary amino group. Examples of suitable ketones are acetone, methyl ethyl ketone, methyl propyl ketone, methyl isopropyl ketone, methyl isobutyl ketone, methyl isoamyl ketone, diethyl ketone, dipropyl ketone and cyclohexanone, acetone, methyl ethyl ketone and methyl isobutyl ketone being particularly preferred.

(C) Secondary amines which may be used concomitantly include any non-aromatic amines, for example dialkylamines, such as dimethylamine, diethylamine, dipropylamine or dibutylamine. However, alkanolamines, e.g. methylethanolamine, ethylethanolamine, diethanolamine, methylisopropanolamine, ethylisopropanolamine and diisopropanolamine, are preferred. Other suitable secondary amines (C) are those which also have a tertiary amino group, e.g. N,N-diethyl-N'-isobutylpropylene-1,3-diamine and N,N-bis(2-hydroxyethyl)-N'-isobutylpropylene-1,3-diamine.

In some cases it may be advantageous if ketimines of primary monoamines are used in addition as component (C). In particular, ketimines of long-chain primary monoamines, e.g. octylamine, laurylamine or stearylamine, or amidoamines obtained from primary diamines and monocarboxylic acids, such as ethylhexanoic acid or higher fatty acids, can be used for plasticizing the coatings produced from the novel synthetic resins.

Finally, it is also possible to use monoketimines of primary/tertiary diamines as component (C). Examples of these are the ketimines of N,N-diethylethylenediamine and of N,N-diethylpropylene-1,3-diamine. These amines are more readily obtainable than the secondary/tertiary diamines stated above, and additional basic groups can be introduced into the resins via the ketimines of these amines.

The proportions of components (A), (B) and, where relevant, (C) can be varied within wide limits. For most intended uses according to the invention, it is desirable to prepare epoxide-free synthetic resins, i.e. the number of epoxide equivalents of epoxy resin (A) employed is preferably from 50 to 100%, based on the sum of the number of equivalents of ketimine and of secondary amine of components (B) and (C). For products which do not contain component (C), the molecular weight of the novel synthetic resin is regulated by means of the ratio of the number of equivalents of epoxide groups to the number of equivalents of ketimine group. The number of epoxide equivalents of epoxy resin (A) employed is then particularly preferably from 50 to 75%, based on the number of equivalents of ketimine of component (B) employed. If component (C) is also used, the achievable molecular weight is additionally restricted by the amount of (monofunctional) component (C). As a result, it is also possible to choose the sum of the number of equivalents of (B) and (C) to be equal to the number of equivalents of (A).

The mean molecular weights $\overline{M}_n$ of the novel synthetic resins should be about 1,000–10,000, and for many purposes, for example for the production of aqueous surface coating systems which can be deposited cataphoretically, mean molecular weights $\overline{M}_n$ of from 1,500 to about 5,000 are desirable.

The reaction of components (A), (B) and, where relevant, (C) is advantageously carried out in the presence of a solvent, for example a hydrocarbon, such as toluene or xylene, a ketone, such as methyl ethyl ketone or methyl isobutyl ketone, an alcohol, such as ethanol or butanol, an ester, an ether or the like, at from 50° to 150° C., preferably from 80° to 130° C.

After treatment with water, the novel synthetic resins contain hydroxyl groups and secondary amino groups and additionally contain primary andor tertiary amino groups. They are therefore capable of undergoing a large number of crosslinking reactions, and this makes them useful surface coating binders when they are mixed with suitable crosslinking agents.

Examples of suitable crosslinking agents for the novel binders are amino resins, such as urea-formaldehyde resins, melamine resins or benzoguanamine resins, phenoplast resins, blocked isocyanate crosslinking agents, crosslinking agents which cure via ester aminolysis and/or transesterification and have on average two or more activated ester groups per molecule, for example β-hydroxyalkyl ester crosslinking agents as described in EP 00 40 867 and carbalkoxymethyl ester crosslinking agents as described in German Patent Application P 32 33 139.8, urea condensates as obtained from, for example, primary di- and/or polyamines, secondary monoamines and urea in the presence or absence of a polyalcohol, e.g. trimethylolpropane, and β-hydroxyalkyl carbamate crosslinking agents as obtained by, for example, reacting a primary polyamine with ethylene carbonate. The amounts of crosslinking agents used depend on the type and number of groups which react with one another in the synthetic resin and crosslinking agent, and on the degree of crosslinking desired. In general, the weight ratio of the synthetic resin to the crosslinking agent is from 1:9 to 9:1, preferably from 1:1 to 9:1, in particular from 1.5:1 to 4:1.

It is not absolutely necessary to add separate crosslinking agents, since crosslinking functions can also be incorporated in the novel synthetic resin to make it self-crosslinking. This can be achieved if, for example, the resin obtained from the reaction of (A), (B) and, where relevant, (C) is reacted with a partially blocked polyisocyanate which also contains on average about one free isocyanate group per molecule. Examples of suitable blocking agents in this case are alcohols, phenols and oximes. Another possible method of modifying the novel synthetic resin to make it self-crosslinking is to introduce β-hydroxyalkyl carbamate groups. To do this, the ketone is first eliminated hydrolytically from the novel resin, and the resulting primary amino groups are then converted to β-hydroxyethyl carbamates, for example with ethylene carbonate.

In addition to crosslinking agents, other substances, such as pigments, assistants, solvents and curing catalysts, can be added. The coating agents prepared in this manner can be applied onto substrates, such as wood, plastic or metal, by a conventional method, such as spraying, dipping, casting or knife-coating. Depending on the type of crosslinking agent, curing of the coatings takes place at from 120° to 210° C. in the course of about 5–40 minutes, the lowest baking temperature requiring the longest baking time.

The amine numbers of the novel synthetic resins are from about 50 to 300 mg of KOH/g. Hence, these resins, alone or mixed with the above crosslinking agents, can be converted to aqueous dispersions by protonating some or all of the amino groups; these dispersions can advantageously be used for electrocoating electrically conductive substrates, such as metal components. For this purpose, a neutralizing agent, e.g. formic acid, acetic acid, lactic acid or phosphoric acid, is stirred in, and the mixture is diluted with water to the processing concentration.

For cathodic electrocoating, the solids content of the electrocoating bath is generally brought to 5–30% by weight. Deposition is conventionally carried out at from 15° to 40° C. for from 0.5 to 5 minutes and at a pH of from 4.0 to 8.5, preferably from 5.0 to 7.5, in general at a deposition voltage of from 50 to 500 volt. The electrically conductive article to be coated is made the cathode. The deposited film is cured at above 120° C. for about 20 minutes.

The examples which follow illustrate the invention but are not intended to restrict it. Parts and percentages are by weight.

1. Preparation of the diketimines of the primary diamines

Component B1:

In a vessel provided with a water-separating head, 348 parts of hexamethylenediamine and 960 parts of methyl isobutyl ketone are refluxed until 108 parts of water have been separated off. The product has an amine number of 267 mg of KOH/g and a solvent content of 30%.

Component B2:

In a vessel provided with a water-separating head, 232 parts of hexamethylenediamine, 290 parts of a dimerized fatty acid and 40 parts of xylene are heated to 190° C. and kept at this temperature for one hour, 29 parts of an aqueous phase being separated off. An amine determination shows that the phase consists of 18 parts of water and 11 parts of hexamethylenediamine. 11 parts of hexamethylenediamine and 621 parts of methyl isobutyl ketone are added to the mixture, and 54 parts of water are separated off under reflux. The product has an amine number of 155 mg of KOH/g and has a solvent content of 30%.

Component B3:

48 parts of an aqueous phase are separated off, in the course of 2 hours at 190° C., from 387 parts of hexamethylenediamine, 580 parts of a dimeric fatty acid and 97 parts of linseed oil fatty acid, with 80 parts of xylene. 552 parts of methyl isobutyl ketone are added to 696 parts of the remaining condensate, and 44 parts of water are separated off. The product has an amine number of 122 mg of KOH/g and a solvent content of 30%.

II. Preparation of the novel synthetic resins carrying basic nitrogen groups

EXAMPLE 1

Any traces of water present are separated off from 217 parts of a diglycidyl ether obtained from 2,2-bis(4-hydroxyphenyl)propane and epichlorohydrin, having an epoxide equivalent weight of 190, and 60 parts of toluene. 285.7 parts of component B1 are then added, and the mixture is kept at 120° C. for 20 hours. After a short time, epoxide groups can no longer be detected. After the methyl isobutyl ketone has been eliminated hydrolytically, the product contains 3.3% of basic nitrogen, of which 0.7% is primary nitrogen, 2.4% is secondary nitrogen and 0.2% is tertiary nitrogen.

COMPARATIVE EXAMPLE 1

This Example corresponds to Example 1, except that, instead of the ketimine of hexamethylenediamine, the free amine itself is used.

A solution of 152 parts of the diglycidyl ether used in Example 1, in 50 parts of xylene, is added dropwise to 50 parts of hexamethylenediamine at 80° C., while cooling, and the temperature is kept at 80° C. by cooling. The product becomes increasingly viscous, and the mixture gels after about 80% of the intended amount has been fed in.

EXAMPLE 2

207.9 parts of a diglycidyl ether obtained from 2,2-bis(4-hydroxyphenyl)propane and epichlorohydrin, having an equivalent weight of 485, and 54.3 parts of a similar diglycidyl ether having an equivalent weight of 190 are refluxed together with 60 parts of toluene in order to remove any traces of water present. 210.9 parts of component B2 and 22.5 parts of diethanolamine are then added, and the mixture is heated to 120° C. After 5 hours, epoxide is no longer detectable. The mixture is diluted with 11.8 parts of butylglycol and 50 parts of isobutanol. The product has a solids content of 70%, which corresponds to a solids content of 60% after the methyl isobutyl ketone has been eliminated hydrolytically.

EXAMPLE 3

258.7 parts of a diglycidyl ether obtained from 2,2-bis(4-hydroxyphenyl)propane and epichlorohydrin, having an equivalent weight of 485, are dissolved in 65 parts of toluene, and any traces of water present are separated off. 214.4 parts of component B3 and 17.5 parts of diethanolamine are added, and the mixture is heated to 120° C. After 2 hours, epoxide is no longer detectable. 83.5 parts of solvent are distilled off under reduced pressure, and are replaced by 16 parts of butylglycol and 120.5 parts of isobutanol. The product has a solids content of 70%, which corresponds to 57.2% after methyl isobutyl ketone has been eliminated hydrolytically.

EXAMPLE 4

214.3 parts of a diglycidyl ether obtained from 2,2-bis(4-hydroxyphenyl)propane and epichlorohydrin, having an equivalent weight of 189, 48 parts of 2,2-bis(4-hydroxyphenyl)propane, 210.9 parts of component B3, 3.22 parts of methylethanolamine and 18 parts of diethanolamine are mixed, and the mixture is kept at 85° C. for 90 minutes and then at 100° C. for 90 minutes. It is then diluted to a solids content of 70% with 14.3 parts of butylglycol and 107 parts of isobutanol. This corresponds to a solids content of 60% after methyl isobutyl ketone has been eliminated hydrolytically.

III. Use of the novel synthetic resins in heat-curable coating agents, in particular in cathodic electrocoating finishes In order to be able to effect crosslinking at elevated temperatures, the synthetic resins carrying basic nitrogen groups have to be mixed with crosslinking agents with which they form stable mixtures at room temperature but undergo crosslinking on heating.

Crosslinking agent 1:

A blocked isocyanate crosslinking agent (polyurethane crosslinking agent) is prepared as described in German Laid-Open Application DOS 2,701,002, Example 1, by the following method: 218 parts of 2-ethylhexanol are added slowly to 291 parts of a stirred 80:20 isomer mixture of 2,4- and 2,6-toluylene diisocyanate under a nitrogen atmosphere, the reaction temperature being kept below 38° C. by external cooling. The mixture is kept at 38° C. for a further half hour and is then heated to 60° C., after which 75 parts of trimethylolpropane are added, followed by the addition of 0.08 part of dibutyltin dilaurate as a catalyst. After an initial exothermic reaction, the mixture is kept at 121° C. for 1.5 hours, after which essentially all the isocyanate groups have been consumed. This can be recognized from the infrared spectrum. The mixture is then diluted with 249 parts of ethylene glycol monoethyl ether.

Crosslinking agent 2:

A polyester crosslinking agent is prepared as described in EP 00 40 867, Example 2d, by the following method: 192 parts of trimellitic anhydride and 500 parts of glycidyl versatate having an epoxide equivalent weight of 250 are mixed, and the mixture is heated at 100° C., while stirring. An exothermic reaction takes place, and the temperature increases to 190° C. The mixture is cooled to 140° C., after which 2 parts of benzyldimethylamine are added. The mixture is kept at 140° C. for 3 hours, and a clear viscous product is formed.

Crosslinking agent 3:

A urea condensate which is suitable as a crosslinking agent is prepared by the following method:

58 parts of hexamethylenediamine, 60.1 parts of 3,3-dimethyl-4,4-diaminodicyclohexylmethane and 90 parts of urea are heated to 160° C. in the course of 2 hours. Above about 120° C., ammonia is eliminated. The reaction mixture is initially liquid but then solidifies to a white crystalline mass. The temperature is increased until a clear melt is formed at 180° C. 193.5 parts of dibutylamine are added at this temperature in the course of 8 hours. When the addition is complete, the mixture is kept at 180°-190° C. until refluxing no longer takes place. This requires about 4 hours. After cooling, the urea condensate solidifies to a colorless glassy mass with a softening point of about 100° C.

EXAMPLE 5

42.6 parts of crosslinking agent 1, 2 parts of dibutyltin dilaurate and 2.3 parts of acetic acid are added to 117 parts of the synthetic resin described in Example 2.

EXAMPLE 6

42.6 parts of crosslinking agent 3 are added to 125 parts of the synthetic resin described in Example 3, and the mixture is stirred. 2.5 parts of acetic acid are added to give a product which can be diluted with water.

EXAMPLE 7

125 parts of the synthetic resin described in Example 3, 30 parts of crosslinking agent 2, 3 parts of lead octoate (24% of Pb) and 2.5 parts of acetic acid are mixed at room temperature.

EXAMPLE 8

42.6 parts of crosslinking agent 3 are added to 116 parts of the synthetic resin described in Example 4, and the mixture is stirred. 24 parts of a 10% strength aqueous acetic acid solution are then added.

IV. Testing the binders

In order to test the binders as cathodic electrocoating finishes, acid is added to the binders, which are then covered to 10% strength dispersions by adding water. 1,000 parts of each binder dispersion are stirred with 66 parts of a pigment paste prepared as described below.

Pigment paste

A paste binder is prepared as described in Example 1a of German Laid-Open Application DOS 3,121,765. To do this, 200 parts of ethylene glycol monobutyl ether are heated to 90° C. in a reaction vessel, after which a mixture of 396 parts of N-vinylpyrrolidone, 204 parts of vinyl propionate and 1.2 parts of azobisisobutyronitrile is added dropwise in the course of 2 hours. Finally, polymerization is continued for 1 hour at 90° C. The resulting solution polymer has a Fikentscher K value of 24, and the solids content of the copolymer solution is 76%.

250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads having a diameter of 2 mm are stirred for 45 minutes at a speed of 1,000 rpm in a stirred ball mill. After the glass beads have been separated off, a black paste having a solids content of 50.6% is obtained.

The baths are stirred for 48 hours at 30° C. Surface coating films are deposited, in the course of 2 minutes and at the stated voltage, on zinc-phosphatized steel test sheets which have been made the cathode. Baking is carried out for 20 minutes at 180° C. or 160° C. The resistance to acetone is tested by rubbing 50 times with a cottonwool ball impregnated with acetone, the flexibility is tested in terms of the reverse impact, and the resistance to salt spray mist is checked. The results are shown in the Table below.

| Surface coating according to | pH | Ford throwing power (voltage) | Resistance to acetone (baking temperature) | Reverse impact [in × lb] | Exposure for 500 hours to salt spray mist according to ASTM (creepage at the scribe) |
|---|---|---|---|---|---|
| Example 5 | 7.4 | 20 cm (300 V) | 1 (180° C.) | 160 | 1 mm |
| Example 6 | 7.2 | 22 cm (290 V) | 1 (160° C.) | 160 | 0.5–1 mm |
| Example 7 | 7.0 | 21 cm (320 V) | 2 (180° C.) | 160 | 1 mm |
| Example 8 | 7.5 | 22 cm (300 V) | 1 (160° C.) | 160 | 0.5 mm |

Resistance to acetone:
1 = very good
6 = insufficient

We claim:

1. A synthetic resin which carries basic nitrogen groups and can be diluted with water as a result of protonation with an acid, and which is obtainable by reacting
    (A) one or more epoxy resins having a mean molecular weight $\overline{M}_n$ of from 300 to 6,000 and containing on average from 1.5 to 3.0 epoxide groups per molecule with
    (B) a diketimine of a primary diamine and, optionally,
    (C) a secondary amine, which may additionally contain a tertiary amino group, a ketimine of a primary monoamine or a ketimine of a primary/tertiary diamine.

2. A synthetic resin which carries basic nitrogen groups and can be diluted with water as a result of protonation with an acid, as defined in claim 1, wherein some or all of the hydroxyl groups of the product of (A), (B) and, where present, (C) have been reacted with partially blocked polyisocyanate to give urethane groups.

3. A process for producing a synthetic resin which carries basic nitrogen groups and can be diluted with water as a result of protonation with an acid, which process comprises: reacting
    (A) one or more epoxy resins having a mean molecular weight $\overline{M}_n$ of from 300 to 6,000 and containing on average from 1.5 to 3.0 epoxide groups per molecule with
    (B) a diketimine of a primary diamine, and, optionally
    (C) a secondary amine, which may additionally contain a tertiary amino group, a ketimine of a primary monoamine or a ketimine of a primary/tertiary diamine,
wherein the number of epoxide equivalents of epoxy resin (A) employed is from 50 to 100% based on the sum of the number of equivalents of ketimine and secondary amine of components (B) and (C).

4. The process of claim 3, wherein the epoxy resin (A) used is a glycidyl ether of a polyphenol which contains on average two or more phenolic hydroxyl groups per molecule and has a mean molecular weight $\overline{M}_n$ of from 350 to 5,000.

5. The process of claim 3, wherein the component (B) used is a diketimine obtained from two moles of methyl isobutyl ketone and one mole of a diamine.

6. The process of claim 3, wherein the component (B) used is a diketimine obtained from a diamine having a molecular weight of from 88 to 1,000.

7. The process of claim 5, wherein the component (B) used is a diketimine obtained from an aliphatic diamine of 4 to 18 carbon atoms.

8. A process for the cathodic electrocoating of an electrically conductive substrate which comprises: applying a deposition voltage to the substrate in contact with the synthetic resin protonated with an acid, as defined in claim 1.

9. A coating agent which contains, as a binder, a synthetic resin as defined in claim 1 which carries basic nitrogen groups and can be diluted with water as a result of protonation with an acid and additionally contains a crosslinking agent.

10. A coating agent as defined in claim 9, wherein the crosslinking agent is an amino resin or a phenoplast resin.

11. A coating agent as defined in claim 9, wherein the crosslinking agent is a blocked polyvalent isocyanate.

12. A coating agent as defined in claim 9, wherein the crosslinking agent is a compound which is capable of ester aminolysis or transesterification and which contains on average two or more activated ester groups per molecule.

13. A coating agent as defined in claim 9, wherein the crosslinking agent is a urea condensate which is obtained by reacting a primary diamine or polyamine with urea and a secondary monoamine in the presence or absence of a polyalcohol at elevated temperatures with removal of the ammonia formed.

14. A process for the production of coatings by cathodic electrocoating which comprises: applying a deposition voltage to a metallic article immersed in an electrocoating bath, wherein the said bath contains a synthetic resin as defined in claim 1 protonated with an acid, and optionally pigments, organic solvents and other assistants.

15. An article provided with a surface coating, wherein the coating is obtained by applying an aqueous dispersion of the synthetic resin described in claim 1 to the article, and then baking.

16. An article provided with a surface coating, wherein the coating is obtained by applying a coating agent as defined in claim 9, and then baking.

17. The process of claim 14, wherein the bath further contains a crosslinking agent.

* * * * *